Patented Sept. 6, 1949

2,481,474

UNITED STATES PATENT OFFICE 2,481,474

PORCELAIN ENAMEL

Gilbert Goodman, Bayonne, N. J., assignor to Bell Telephone Laboratories, Incorporated, New York, N. Y., a corporation of New York No Drawing. Application April 30, 1946, Serial No. 666,509

3 Claims. (Cl. 106—49)

This invention relates to ceramic compositions and methods of making them and more particularly to ceramic coating compositions having a high adherence-to-metal characteristic and a minimum of vesicular nature and to methods of making them.

In the manufacture of wire-wound resistors utilizing nickel-chromium resistance wire wound on ceramic cores, it has hitherto been proposed to insulate the wound resistance wire with a ceramic coating prepared from a thixotropic enamel slip which may include a frit, and ingredients such as colloidal clay, an opacifier and magnesium carbonate. After this composition had been fired, it was discovered that the coating adhered to the ceramic core but did not adhere strongly to the nickel-iron alloy terminal bands, thereby weakening and lessening the effectiveness of the coating. It was also found that the fired enamel had a highly vesicular structure due to the inability of the evolved carbon dioxide to escape because of the viscous nature of the enamel in the molten condition, and in part probably due to the decomposition products of the colloidal clay. If the alkalinity of the frit is sufficient to cause deflocculation, the magnesium carbonate may be omitted and a less vesicular end product will be obtained. However, the structure is still vesicular and the adherence-to-metal qualities are not improved by the omission of the magnesium carbonate.

The objects of this invention are to provide improved ceramic coating compositions and methods of producing them.

In accordance with one embodiment of this invention, strontium chloride or barium chloride is added to an enamel slip to give the enamel a high adherence-to-metal characteristic and a dense structure after firing.

It has been found that a suitable frit may be made up according to any of the formulae given below:

| Ingredient | Parts by Weight | | |
|---|---|---|---|
| Flint ($SiO_2$) | 27 | 34.7 | 35.7 | 36.9 |
| Red Lead ($Pb_3O_4$) | 10 | 18.5 | 19.6 | 22.8 |
| Potash Feldspar ($K_2O.Al_2O_3.6SiO_2$) | 23 | | | |
| Boric Acid ($H_3BO_3$) | 10 | 8.9 | 30.9 | 29.9 |
| Borax ($Na_2B_4O_7.10H_2O$) | 26 | 30.8 | 6.6 | |
| Potassium Nitrate ($KNO_3$) | | 5.7 | 5.8 | |
| Chromic Oxide ($Cr_2O_3$) | | 0.9 | 0.9 | 0.9 |
| Cobalt Oxide ($Co_3O_4$) | 0.5 | 0.5 | 0.5 | 0.8 |
| Sodium Nitrate ($NaNO_3$) | 3.0 | | | |
| Manganese Dioxide ($MnO_2$) | 0.5 | | | |
| Titanium Dioxide ($TiO_2$) | | | | 2.5 |
| Potassium Chloride (KCl) | | | | 4.6 |
| Sodium Fluoride (NaF) | | | | 1.6 |

The mixed frit composition is then heated and when molten, it is allowed to flow into relatively cold water, thus "shattering" the frit. The frit is further pulverized in a ball mill or other suitable pulverizing device.

The pulverized frit is then incorporated in an enamel slip which may have the following proportions by weight:

| | |
|---|---|
| Frit | 100.0 |
| Bentonite (colloidal clay) | 2.0 |
| Opacifier (zirconium oxide) | 9.0 |
| Strontium chloride | 2.0 |

These components may be mixed in a ball mill with a suitable amount of water to provide a fluidity and viscosity consistent with the planned use of the enamel and with the available apparatus. A suitable defloccuIant may be added to the slip if desired.

Departures in the proportions shown in the examples may be made to change the maturing temperature of the enamel or the degree of water solubility of the frit or both. Barium chloride may be used in place of strontium chloride; however, the latter is preferable because of its lower melting point.

Chromic oxide acts as a pigment and also to help prevent the dissolving of the Nichrome resistance wire during the firing. Cobalt oxide acts as a pigment and to promote adherence of the enamel to metals. The opacifier, which may be zirconium oxide, provides opacity. The bentonite or colloidal clay is added for body. Lead borosilicate ceramic compositions, that are not metal adherent, will be rendered metal adherent by the addition of strontium chloride or barium chloride and those that are to some degree metal adherent will have an improved metal adherence characteristic by the addition of strontium or barium chloride.

An object may be coated by dipping it in the slip or by allowing the slip to flow upon the object, thereby covering the object. The covered object is then dried in a normal atmosphere and subjected to heat to fire the enamel. This process may be repeated to increase the thickness of the coating. It will be found that after firing the enamel, the structure is relatively dense and any metal covered by the enamel will be tenaciously adhered to by the enamel.

Strontium or barium chloride is effective in eliminating the vesicular structure of the enamel in concentrations from about 1 per cent to 5 per cent by weight. Contrary to expectations, the addition of strontium chloride to the enamel while it does improve the melting properties of the enamel, decreases rather than increases the fluidity, that is, strontium chloride although normally a flux, increases the refractoriness of the enamel. The addition, however, is beneficial because it produces satisfactory adherence of the enamel to metal, which had heretofore not been accomplished with any degree of effectiveness. The maturing temperature of the enamel increases with increasing percentages of strontium chloride and it is therefore desirable to use the minimum percentage which will effect the desired result. To speed up production, the setting-up time of the enamel may be decreased by adding a suitable substance to deflocculate the enamel. When a sufficient amount of strontium chloride necessary to inhibit the formation of a vesicular enamel structure was added, it was found that the desired adherence-to-metal characteristic was also attained.

What is claimed is:

1. A lead borosilicate enamel slip comprising a lead borosilicate frit, colloidal clay, and in addition to said frit and clay between about 1 per cent and about 5 per cent by weight of a compound selected from the group consisting of strontium chloride and barium chloride.

2. A lead borosilicate enamel slip comprising a lead borosilicate frit, colloidal clay and an aqueous solution of strontium chloride, said strontium chloride being present in an amount between about 1 per cent and about 5 per cent by weight of the slip.

3. A ceramic slip composition comprising by weight 2 parts of colloidal clay, 9 parts of zirconium oxide, a quantity of strontium chloride varying from 1 per cent to 5 per cent by weight of the whole of said ceramic composition, and 100 parts of frit, said frit comprising by weight 34.7 parts of flint, 18.5 parts of red lead, 8.9 parts of boric acid, 30.8 parts of borax, 5.7 parts of potassium nitrate, 0.9 part of chromic oxide and 0.5 part of cobalt oxide.

GILBERT GOODMAN.

REFERENCES CITED

The following references are of record in the file of this patent:

UNITED STATES PATENTS

| Number | Name | Date |
|---|---|---|
| 1,833,087 | Migeat | Nov. 24, 1931 |
| 1,917,317 | Benner et al. | July 18, 1933 |

FOREIGN PATENTS

| Number | Country | Date |
|---|---|---|
| 590,651 | Germany | 1934 |